(12) United States Patent
Kovach et al.

(10) Patent No.: US 11,702,941 B2
(45) Date of Patent: Jul. 18, 2023

(54) AIRFOIL WITH BAFFLE HAVING FLANGE RING AFFIXED TO PLATFORM

(71) Applicant: United Technologies Corporation, Farmington, CT (US)

(72) Inventors: Scott A. Kovach, Higganum, CT (US); Tracy A. Propheter-Hinckley, Rocky Hill, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 245 days.

(21) Appl. No.: 16/532,638

(22) Filed: Aug. 6, 2019

(65) Prior Publication Data

US 2020/0149404 A1    May 14, 2020

Related U.S. Application Data

(60) Provisional application No. 62/757,916, filed on Nov. 9, 2018.

(51) Int. Cl.
   *F01D 5/18*    (2006.01)
   *F01D 9/06*    (2006.01)

(52) U.S. Cl.
   CPC .............. *F01D 5/189* (2013.01); *F01D 9/065* (2013.01); *F05D 2220/32* (2013.01); *F05D 2240/301* (2013.01); *F05D 2260/201* (2013.01)

(58) Field of Classification Search
   CPC .. F01D 5/186–189; F01D 9/065; F01D 25/12; F01D 5/147; F01D 5/181
   See application file for complete search history.

(56) References Cited

U.S. PATENT DOCUMENTS

| | | | | |
|---|---|---|---|---|
| 1,703,037 A | * | 2/1929 | Heck ....................... | F16L 13/04 228/136 |
| 2,878,040 A | * | 3/1959 | Hobbs ................. | F16L 13/0209 285/288.1 |
| 2,926,030 A | * | 2/1960 | Rozmus ............... | B23K 33/006 285/288.3 |

(Continued)

FOREIGN PATENT DOCUMENTS

| EP | 32711502 | 3/2014 |
|---|---|---|
| EP | 3279434 | 2/2018 |

OTHER PUBLICATIONS

European Search Report for European Patent Application No. 19207539.8 completed Apr. 1, 2020.

*Primary Examiner* — Woody A Lee, Jr.
*Assistant Examiner* — Behnoush Haghighian
(74) *Attorney, Agent, or Firm* — Carlson, Gaskey & Olds, P.C.

(57) ABSTRACT

An airfoil includes an airfoil section that has an airfoil wall that defines leading and trailing ends and first and second sides that join the leading and trailing ends. The first and second sides span in a longitudinal direction between first and second ends. The airfoil wall circumscribes an internal core cavity. A platform is attached with the first end of the airfoil wall. The platform includes an opening that opens into the internal core cavity and a land region that circumscribes the opening. A baffle is formed of a tube and an (Continued)

attachment portion. The tube extends in the internal core cavity and the attachment portion has a flange ring that is affixed to the platform at the land region.

9 Claims, 4 Drawing Sheets

(56) References Cited

U.S. PATENT DOCUMENTS

| | | | | |
|---|---|---|---|---|
| 3,301,527 A * | 1/1967 | Kercher | | F01D 5/189 |
| | | | | 415/115 |
| 4,065,846 A * | 1/1978 | Leonard, Jr. | | B23K 37/0533 |
| | | | | 29/402.06 |
| 4,260,134 A * | 4/1981 | Ripert | | F16K 27/105 |
| | | | | 251/329 |
| 4,992,026 A * | 2/1991 | Ohtomo | | F01D 5/187 |
| | | | | 415/115 |
| 5,068,083 A * | 11/1991 | John, Jr. | | G21C 3/332 |
| | | | | 376/449 |
| 5,145,315 A * | 9/1992 | North | | F01D 5/189 |
| | | | | 29/889.722 |
| 5,630,700 A * | 5/1997 | Olsen | | F01D 9/042 |
| | | | | 415/134 |
| 5,634,766 A * | 6/1997 | Cunha | | F01D 5/187 |
| | | | | 415/115 |
| 5,743,708 A * | 4/1998 | Cunha | | F01D 5/187 |
| | | | | 415/115 |
| 6,019,572 A * | 2/2000 | Cunha | | F01D 5/187 |
| | | | | 415/114 |
| 6,220,015 B1* | 4/2001 | Mina | | F23R 3/48 |
| | | | | 60/39.37 |
| 6,260,401 B1* | 7/2001 | Tada | | B21C 37/16 |
| | | | | 72/318 |
| 6,413,040 B1* | 7/2002 | Yu | | F01D 9/065 |
| | | | | 415/115 |
| 6,450,759 B1* | 9/2002 | Miller | | F01D 5/187 |
| | | | | 415/115 |
| 6,543,993 B2* | 4/2003 | Burdgick | | F01D 25/12 |
| | | | | 415/116 |
| 6,554,563 B2* | 4/2003 | Noe | | F01D 5/189 |
| | | | | 415/115 |
| 6,557,343 B2* | 5/2003 | Furudate | | F01N 13/08 |
| | | | | 60/324 |
| 6,582,186 B2* | 6/2003 | Manzoori | | F01D 5/182 |
| | | | | 415/115 |
| 6,742,984 B1* | 6/2004 | Itzel | | F01D 5/189 |
| | | | | 29/889.722 |
| 7,080,971 B2* | 7/2006 | Wilson | | F01D 5/147 |
| | | | | 416/92 |
| 7,104,756 B2* | 9/2006 | Harding | | F01D 5/189 |
| | | | | 416/233 |
| 7,338,080 B2* | 3/2008 | Urase | | B62D 55/10 |
| | | | | 280/781 |
| 7,481,350 B1* | 1/2009 | Shah | | B23K 33/006 |
| | | | | 228/169 |
| 7,670,116 B1* | 3/2010 | Wilson, Jr. | | F01D 5/147 |
| | | | | 416/226 |
| 7,708,319 B2* | 5/2010 | Yoshihara | | F16L 13/02 |
| | | | | 285/288.1 |
| 7,798,773 B2* | 9/2010 | Pellet | | F01D 5/189 |
| | | | | 415/191 |
| 8,015,705 B2* | 9/2011 | Wilson, Jr. | | F01D 5/189 |
| | | | | 29/889.721 |
| 8,047,001 B2* | 11/2011 | Beeck | | F23R 3/14 |
| | | | | 60/737 |
| 8,083,485 B2* | 12/2011 | Chon | | F01D 5/187 |
| | | | | 416/97 R |
| 8,142,137 B2* | 3/2012 | Johnston | | F01D 9/041 |
| | | | | 415/115 |
| 8,322,976 B2* | 12/2012 | Chila | | F01D 9/023 |
| | | | | 415/135 |
| 8,348,613 B2* | 1/2013 | Gregg | | F01D 5/189 |
| | | | | 416/96 A |
| 8,393,867 B2* | 3/2013 | Chon | | F01D 5/188 |
| | | | | 416/96 A |
| 8,480,366 B2* | 7/2013 | Malecki | | F01D 5/189 |
| | | | | 416/96 A |
| 8,650,864 B2* | 2/2014 | Waggoner | | F01N 13/10 |
| | | | | 60/298 |
| 8,925,464 B1* | 1/2015 | Quioc | | B60R 21/264 |
| | | | | 102/530 |
| 9,120,189 B2* | 9/2015 | Franchet | | B23P 15/04 |
| 9,328,614 B2* | 5/2016 | Klein | | B23K 20/021 |
| 9,328,618 B2* | 5/2016 | Grohens | | F01D 5/189 |
| 9,366,175 B2* | 6/2016 | Kubota | | B23K 26/244 |
| 9,387,308 B2* | 7/2016 | Hinchliffe | | A61M 5/007 |
| 9,523,283 B2* | 12/2016 | Uechi | | F01D 5/189 |
| 9,845,691 B2* | 12/2017 | Allen | | F01D 25/00 |
| 9,874,103 B2* | 1/2018 | Leconte | | B23K 9/167 |
| 10,001,016 B2* | 6/2018 | Stiehler | | F01D 5/26 |
| 10,012,106 B2* | 7/2018 | Spangler | | F01D 5/189 |
| 10,173,264 B2* | 1/2019 | Propheter-Hinckley | | |
| | | | | B22F 12/00 |
| 10,184,343 B2* | 1/2019 | Lacy | | F01D 5/041 |
| 10,197,006 B2* | 2/2019 | Jiang | | F02F 1/242 |
| 10,294,996 B2* | 5/2019 | Nielsen | | F04D 29/26 |
| 10,301,964 B2* | 5/2019 | Spangler | | F01D 25/14 |
| 10,408,073 B2* | 9/2019 | Groves, II | | F01D 9/065 |
| 10,494,939 B2* | 12/2019 | Spangler | | F01D 9/065 |
| 10,577,954 B2* | 3/2020 | Kington | | F01D 5/189 |
| 10,781,715 B2* | 9/2020 | Propheter-Hinckley | | |
| | | | | F01D 9/065 |
| 10,794,289 B2* | 10/2020 | Groves, II | | F01D 5/186 |
| 2002/0085910 A1* | 7/2002 | Burdgick | | F01D 5/188 |
| | | | | 415/116 |
| 2002/0114696 A1* | 8/2002 | Miller | | F02C 7/18 |
| | | | | 415/115 |
| 2003/0031555 A1* | 2/2003 | Noe | | F01D 5/189 |
| | | | | 415/115 |
| 2004/0156759 A1* | 8/2004 | Foster | | F01N 13/1888 |
| | | | | 422/177 |
| 2006/0034679 A1* | 2/2006 | Harding | | F01D 9/041 |
| | | | | 415/115 |
| 2006/0120869 A1* | 6/2006 | Wilson | | F01D 5/147 |
| | | | | 416/97 R |
| 2008/0079308 A1* | 4/2008 | Kretschmer | | B60B 35/16 |
| | | | | 301/124.1 |
| 2008/0260538 A1* | 10/2008 | Wilson | | F01D 5/189 |
| | | | | 416/97 R |
| 2009/0081048 A1* | 3/2009 | Beeck | | F02C 3/16 |
| | | | | 416/97 R |
| 2009/0193657 A1* | 8/2009 | Wilson, Jr. | | F01D 5/20 |
| | | | | 29/889.721 |
| 2009/0246023 A1* | 10/2009 | Chon | | F01D 5/188 |
| | | | | 416/95 |
| 2010/0044023 A1* | 2/2010 | Canales | | F28D 1/0477 |
| | | | | 165/178 |
| 2010/0129196 A1* | 5/2010 | Johnston | | F01D 5/188 |
| | | | | 415/115 |
| 2010/0290917 A1* | 11/2010 | Wilson, Jr. | | F01D 5/189 |
| | | | | 416/226 |
| 2011/0020137 A1* | 1/2011 | Wilson, Jr. | | F01D 5/20 |
| | | | | 416/97 R |
| 2011/0305580 A1* | 12/2011 | Wilson, Jr. | | F01D 5/189 |
| | | | | 416/226 |
| 2013/0051980 A1* | 2/2013 | Grohens | | F01D 9/04 |
| | | | | 415/115 |
| 2013/0294920 A1* | 11/2013 | Klein | | B23K 20/021 |
| | | | | 29/889.71 |
| 2013/0309079 A1* | 11/2013 | Allen | | F01D 5/189 |
| | | | | 415/208.1 |
| 2013/0315725 A1* | 11/2013 | Uechi | | F01D 5/18 |
| | | | | 415/208.1 |
| 2015/0086377 A1* | 3/2015 | Leconte | | B23K 20/233 |
| | | | | 29/889.71 |
| 2015/0226085 A1* | 8/2015 | Spangler | | F01D 25/14 |
| | | | | 60/806 |

(56) References Cited

U.S. PATENT DOCUMENTS

| | | |
|---|---|---|
| 2016/0023275 A1* | 1/2016 | Propheter-Hinckley ................... B22F 5/009 416/96 A |
| 2017/0175578 A1* | 6/2017 | Propheter-Hinckley ................... F02C 3/04 |
| 2017/0198602 A1* | 7/2017 | Hernandez .............. F01D 25/12 |
| 2017/0234151 A1* | 8/2017 | Spangler ................. F01D 5/189 415/115 |
| 2018/0003058 A1* | 1/2018 | Durkin ...................... E21F 1/04 |
| 2018/0038237 A1 | 2/2018 | Banks et al. |
| 2018/0274377 A1* | 9/2018 | Kington ................. F01D 9/065 |

* cited by examiner

AIRFOIL WITH BAFFLE HAVING FLANGE RING AFFIXED TO PLATFORM

CROSS-REFERENCE TO RELATED APPLICATION

This application claims priority to U.S. Provisional Application No. 62/757,916 filed Nov. 9, 2018.

BACKGROUND

A gas turbine engine typically includes a fan section, a compressor section, a combustor section and a turbine section. Air entering the compressor section is compressed and delivered into the combustion section where it is mixed with fuel and ignited to generate a high-speed exhaust gas flow. The high-speed exhaust gas flow expands through the turbine section to drive the compressor and the fan section. The compressor section typically includes low and high pressure compressors, and the turbine section includes low and high pressure turbines.

The high pressure turbine drives the high pressure compressor through an outer shaft to form a high spool, and the low pressure turbine drives the low pressure compressor through an inner shaft to form a low spool. The fan section may also be driven by the low inner shaft. A direct drive gas turbine engine includes a fan section driven by the low spool such that the low pressure compressor, low pressure turbine and fan section rotate at a common speed in a common direction.

SUMMARY

An airfoil according to an example of the present disclosure includes an airfoil section that has an airfoil wall that defines leading and trailing ends and first and second sides that joins the leading and trailing ends. The first and second sides span in a longitudinal direction between first and second ends. The airfoil wall circumscribes an internal core cavity. A platform is attached with the first end of the airfoil wall. The platform includes an opening that opens into the internal core cavity and a land region circumscribing the opening. A baffle is formed of a tube and an attachment portion. The tube extends in the internal core cavity and the attachment portion has a flange ring affixed to the platform at the land region.

In a further embodiment of any of the foregoing embodiments, the tube and the attachment portion are connected to each other at a weld joint.

In a further embodiment of any of the foregoing embodiments, the tube and the attachment portion overlap at the weld joint.

In a further embodiment of any of the foregoing embodiments, the weld joint is continuous around the tube.

In a further embodiment of any of the foregoing embodiments, the attachment portion includes a tapered neck portion, and the tapered neck portion is connected to the tube at the weld joint.

In a further embodiment of any of the foregoing embodiments, the tube and the tapered neck portion overlap at the weld joint.

In a further embodiment of any of the foregoing embodiments, the tube defines a first tube end and a second tube end. The first tube end is connected in the weld joint, and further includes a cover connected to the second tube end.

In a further embodiment of any of the foregoing embodiments, the tube includes a flared end connected to the attachment portion at the weld joint.

A further embodiment of any of the foregoing embodiments includes a cover connected to an end of the tube opposite the flared end of the tube.

In a further embodiment of any of the foregoing embodiments, the flange ring has four perimeter apexes.

In a further embodiment of any of the foregoing embodiments, the attachment portion includes a tapered neck portion, and the tapered neck portion and the tube are connected to each other at a weld joint.

In a further embodiment of any of the foregoing embodiments, the tube includes a flared end, and the flared end and the attachment portion are connected to each other at a weld joint.

A gas turbine engine according to an example of the present disclosure includes a compressor section, a combustor in fluid communication with the compressor section, and a turbine section in fluid communication with the combustor. The turbine section has a turbine airfoil according to any of the foregoing embodiments.

A baffle for an airfoil according to an example of the present disclosure includes a tube that is configured to extend in an internal core cavity of an airfoil, and an attachment portion that has a flange ring configured to be affixed to a land region of a platform of the airfoil.

In a further embodiment of any of the foregoing embodiments, the tube and the attachment portion are connected to each other at a weld joint.

In a further embodiment of any of the foregoing embodiments, the attachment portion includes a tapered neck portion, and the tapered neck portion is connected to the tube at the weld joint.

In a further embodiment of any of the foregoing embodiments, the tube includes a flared end connected to the attachment portion at the weld joint.

In a further embodiment of any of the foregoing embodiments, the flange ring has four perimeter apexes.

In a further embodiment of any of the foregoing embodiments, the attachment portion includes a tapered neck portion, and the tapered neck portion and the tube are connected to each other at a weld joint.

In a further embodiment of any of the foregoing embodiments, the tube includes a flared end, and the flared end and the attachment portion are connected to each other at a weld joint.

BRIEF DESCRIPTION OF THE DRAWINGS

The various features and advantages of the present disclosure will become apparent to those skilled in the art from the following detailed description. The drawings that accompany the detailed description can be briefly described as follows.

DETAILED DESCRIPTION

Figure 1:
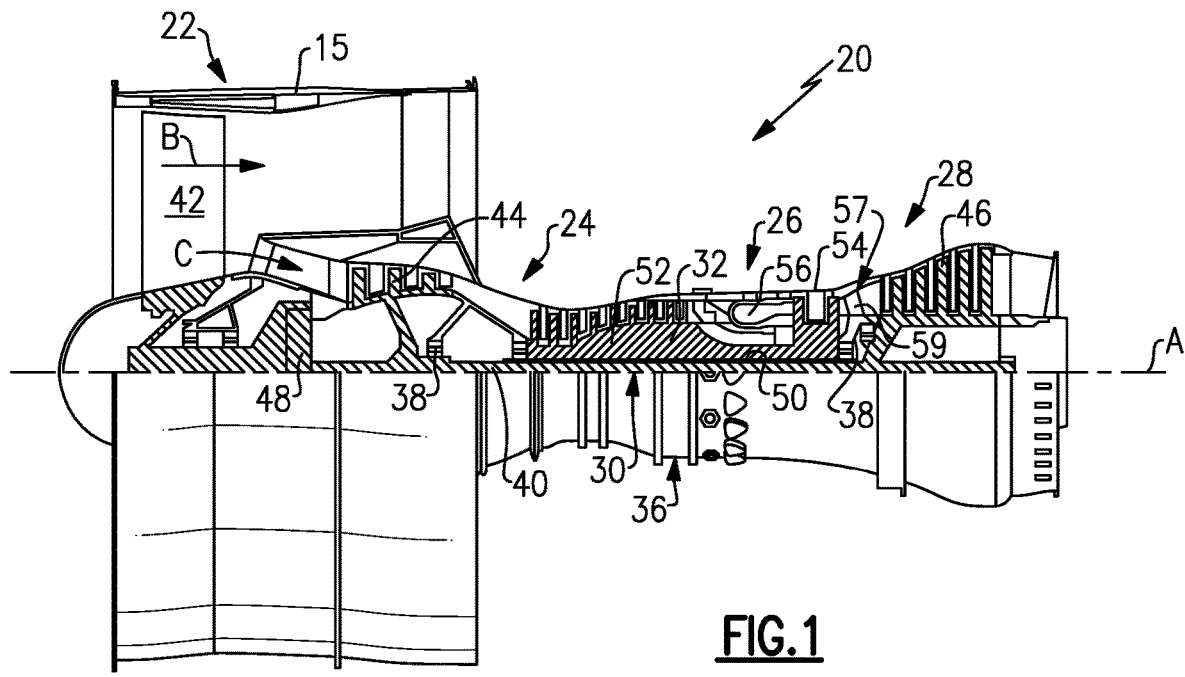
FIG. 1 illustrates an example gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a nacelle 15, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive a fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1 and less than about 5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of [(Tram ° R)/(518.7° R)]^0.5. The "Low corrected fan tip speed" as disclosed herein according to one non-limiting embodiment is less than about 1150 ft/second (350.5 meters/second).

Figure 2:
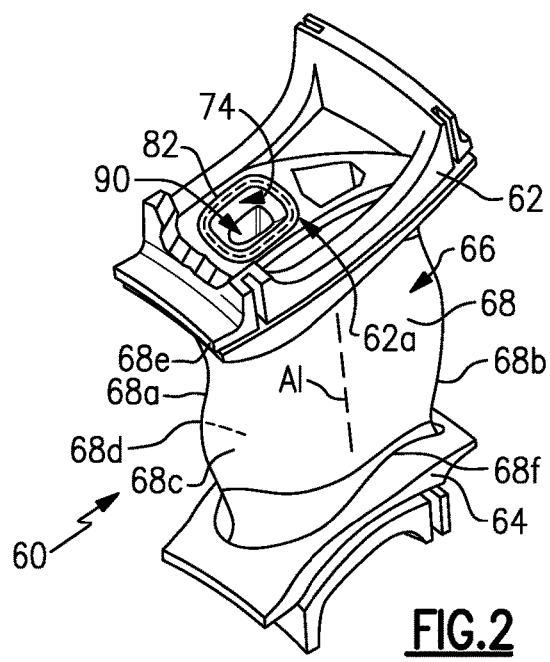
FIG. 2 illustrates an airfoil of the engine of FIG. 1.
Figure 3:
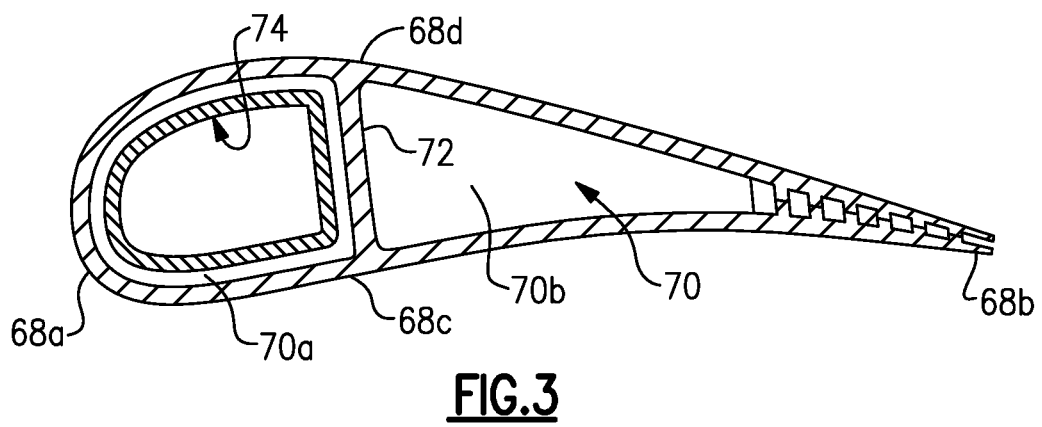
FIG. 3 illustrated a sectioned view of the airfoil of FIG. 2.

FIG. 2 illustrates a representative example of a turbine airfoil 60 used in the turbine engine 20 (see also FIG. 1), and FIG. 3 illustrates a sectioned view of the airfoil 60. As shown, the turbine airfoil 60 is a turbine vane; however, it is to be understood that, although the examples herein may be described with reference to the turbine vane, this disclosure is also applicable to turbine blades.

The turbine airfoil 60 includes an outer or first platform 62, an inner or second platform 64, and an airfoil section 66 that spans in a longitudinal direction A1 (which is also a radial direction relative to the engine central axis A) between the first and second platforms 62/64. Terms such as "radially," "axially," or variations thereof are used herein to designate directionality with respect to the engine central axis A.

The airfoil section 66 includes an airfoil outer wall 68 that delimits the profile of the airfoil section 66. The outer wall 68 defines a leading end 68a, a trailing end 68b, and first and second sides 68c/68d that join the leading and trailing ends 68a/68b. The first and second sides 68c/68d span in the longitudinal direction between first and second ends 68e/68f. The first and second ends 68e/68f are attached, respectively, to the first and second platforms 62/64. In this example, the first side 68c is a pressure side and the second side 68d is a suction side. As shown in FIG. 3, the outer wall 68 circumscribes an internal core cavity 70. In this example, the airfoil section 66 includes a rib 72 that extends from the first side 68c to the second side 68d and partitions the cavity 70 into a forward core cavity 70a and an aft core cavity 70b.

A baffle 74 is disposed in the internal core cavity 70. In this example, the baffle 74 is in the forward core cavity 70a. During operation, cooling air, such as bleed air from the compressor section 24, is provided to the baffle 74 through the first platform 62. The baffle 74 facilitates distribution of the cooling air in the forward core cavity 70a to cool the outer wall 68 at and near the leading end 68a. For instance, the baffle 74 may include impingement orifices through which the cooling air flows to impinge on the inside surface of the outer wall 68 for cooling.

Figure 4A:
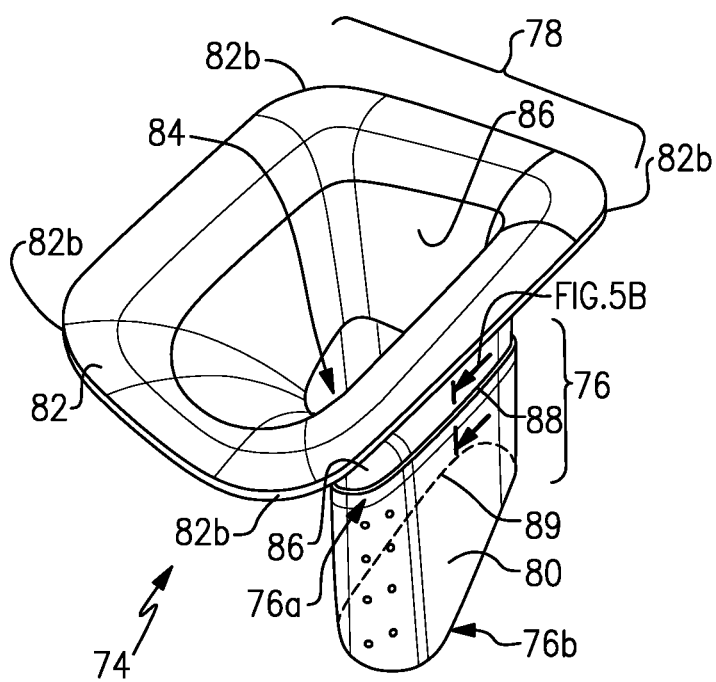
FIG. 4A illustrates an isolated view of a baffle of the airfoil from FIG. 2.
Figure 4B:
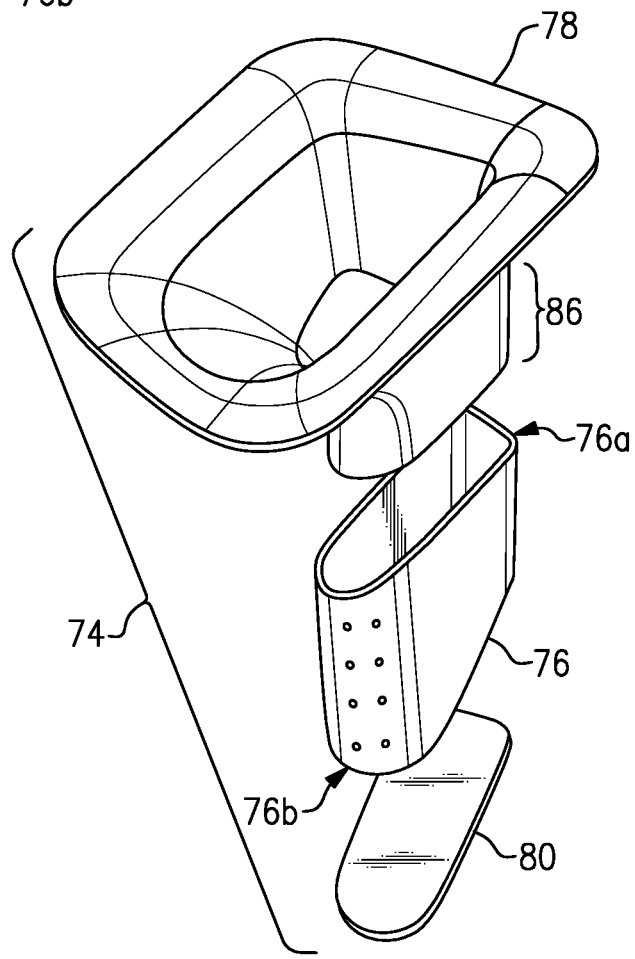
FIG. 4B illustrates an expanded view of the baffle of FIG. 4A.

FIG. 4A shows an isolated view of the baffle 74, and FIG. 4B shows an expanded view of the various sections of the baffle 74. The baffle 74 is formed at least of a tube 76 and an attachment portion 78. In this example, there is also a cover 80. The tube 76, attachment portion 78, and cover 80 may be made of a metallic alloy, such as a nickel- or cobalt-based alloy.

The tube 76 has a shape that is generally congruent with the shape of the forward core cavity 70a. The tube 76 includes a first tube end 76a and a second tube end 76b. The attachment portion 78 includes a flange ring 82 that circumscribes an open central region 84. For instance, the flange ring 82 is a continuous or endless band that circumscribes the open central region 84. In this example, the attachment portion 78 also includes a tapered neck portion 86. For instance, the tapered neck portion 86 is a funnel or funnel-shaped.

Figure 5:
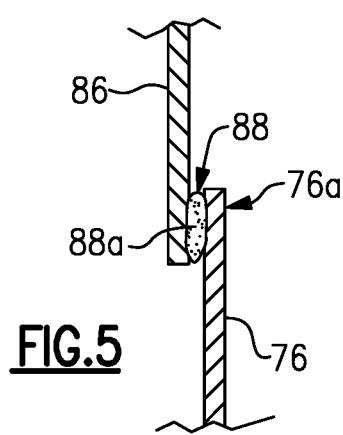
FIG. 5 illustrates a sectioned view through a weld joint of the baffle of FIG. 4A.

The tube 76 and the attachment portion 78 are connected to each other at a weld joint 88. For instance, in this example, the tapered neck portion 86 is connected to the first tube end 76a of the tube 76 at the weld joint 88, and the weld joint 88 is continuous around the tube 76. FIG. 5 illustrates a sectioned view through a representative portion of the weld joint 88. For example, the weld joint 88 may include a weld bead 88a that bonds the tapered neck portion 86 and the tube 76 together. The weld bead 88a may be a weld material that is provided separately from the attachment portion 78 and the tube 76 during a welding process, or an amalgamation of the material of the attachment portion 78 and the tube 76 from melting during a welding process. The weld joint 88 provides a continuous, airtight bond and seal between the tube 76 and the attachment portion 78.

In this example, the tube 76 and the tapered neck portion 86 of the attachment portion 78 overlap at the weld joint 88. Such an overlap may facilitate strengthening of the region of the weld joint 88. In this example, the tapered neck portion 86 is outside of the tube 76. However, it is to be understood that alternatively the tube 76 may be outside of the tapered neck portion 86. The cover 80 is connected to the second tube end 76b. For example, the cover 80 is welded to the tube 76 at another weld joint 89 (FIG. 4A).

Figure 6:
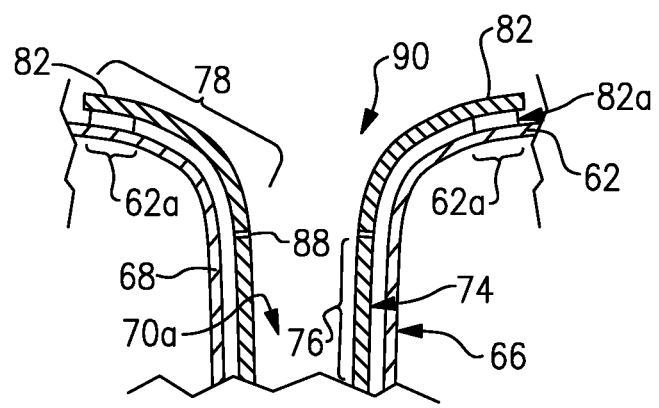
FIG. 6 illustrates a sectioned view of a portion of the platform, airfoil section, and baffle of the airfoil of FIG. 2.

FIG. 6 illustrates a sectioned view through a representative portion of the airfoil section 66, first platform 62, and baffle 74 to demonstrate how the baffle 74 is affixed in the airfoil 60. The first platform 62 includes an opening 90 that opens into the internal core cavity 70 (the forward core cavity 70a in this example). There is a land region 62a that circumscribes the opening 90. For instance, the land region 62a is a relatively smooth band around the opening 90. The tube 76 of the baffle 74 extends in the forward core cavity 70a.

The flange ring 82 of the attachment portion 78 is congruent or substantially congruent with the land region 62a. For instance, the land region 62a may be contoured and thus the flange ring 82 may be identically contoured. The flange ring 82 is affixed to the first platform 62 at the land region 62a. For example, the flange ring 82 is welded at a weld joint 82a to the land region 62a. The weld joint 82a is endless around the flange ring 82 and land region 62a to provide a continuous, airtight bond there between. The weld joint 82a may be formed by laser welding. In this regard, the continuous, relatively smooth shape of the flange ring 82 facilitates laser welding in comparison to complex geometries that include many low angle corners. For example, the flange ring 82 has only rounded perimeter apexes, designated at 82b. In the illustrated example (FIG. 4A), the flange ring 82 has four edge perimeter apexes 82b, which facilitates laser welding in comparison to baffles that have tabs around the perimeter and thus many corners.

Similar to the weld joint 88, the weld joint 82a may include a weld bead that bonds the flange ring 82 and the land region 62a together. In the fixed position, the baffle 74 is positioned with a gap between the baffle 74 and the outer wall 68. Most typically, this gap will be uniform or substantially uniform throughout the forward core cavity 70a. The gap provides an impingement stand-off distance to facilitate impingement cooling.

The components of the baffle 74 may be formed using several manufacturing techniques. For example, pressure-forming involves using a fluid pressure to force a sheet of material into the shape of an adjacent mold. Pressure-forming is not conducive to forming highly contoured sections like the flange ring 82. Pressure-forming, which is conducive to forming relatively simple shapes, can be used to form the tube 76. Deep drawing involves using tensile stress to stretch and plastically deform a metal stock workpiece. Deep drawing, which is conducive to forming highly contoured shapes, can be used to form the contoured shape of the attachment portion 78. The tube 76 and the attachment portion 78 may be formed using different metalworking processes but can then be welded together at the weld joint 88, such as by laser welding. The cover 80 may also be welded to the tube 76. The baffle 74 can then be installed into the airfoil 60 and laser welded to the land region 62a of the first platform 62.

The baffle 74 has only the single weld joint 88 and no other weld seams. Additionally, the congruent shape of the flange ring 82 and the land region 62a permits laser welding, thereby providing complete sealing between the baffle 74 and the platform 62.

Figure 7A:
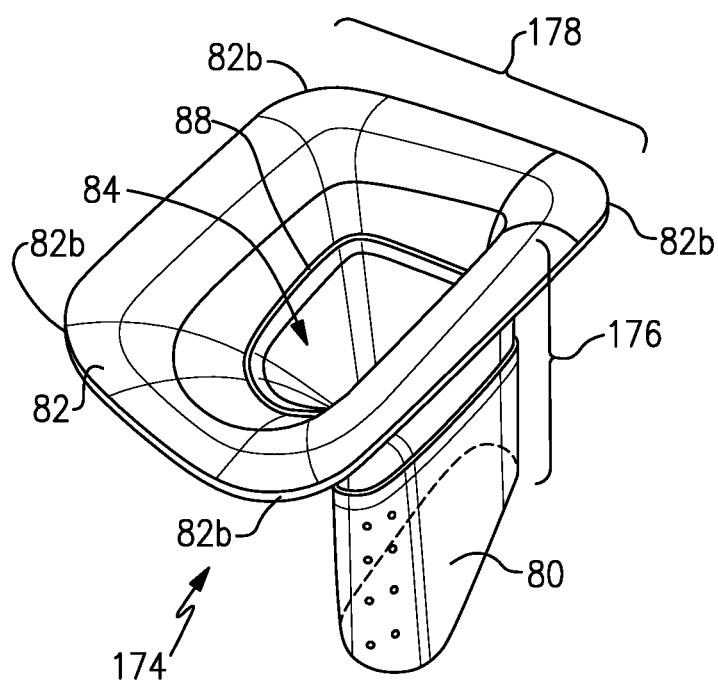
FIG. 7A illustrates an isolated view of another example baffle.
Figure 7B:
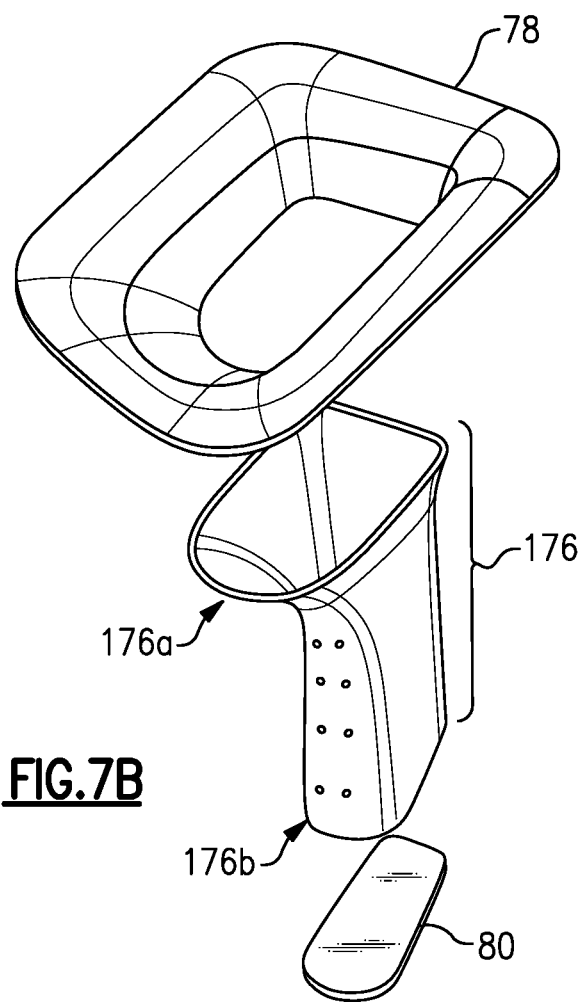
FIG. 7B illustrates an expanded view of the baffle of FIG. 7A.

FIG. 7A shows an isolated view of another example baffle 174, and FIG. 7B shows an expanded view of the various sections of the baffle 174. In this disclosure, like reference numerals designate like elements where appropriate and reference numerals with the addition of one-hundred or multiples thereof designate modified elements that are understood to incorporate the same features and benefits of the corresponding elements. The baffle 174 is formed at least of a tube 176 and an attachment portion 178.

The tube 176 includes a first tube end 176a and a second tube end 176b. In this example, the first tube end 176a is a flared end. The attachment portion 178 also does not have the tapered neck portion 86 of the attachment portion 78. Rather, the funnel or funnel-like shape is provided by the flared first end 176a of the tube 176. The flared first end 176a is connected directly to the flange ring 82 of the attachment portion 178 at the weld joint 88. The tube 176 and the attachment portion 178 may overlap, similar to as shown in FIG. 5.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from this disclosure. The scope of legal protection given to this disclosure can only be determined by studying the following claims.

What is claimed is:

1. An airfoil comprising:
    an airfoil section having an airfoil wall defining leading and trailing ends and first and second sides joining the leading and trailing ends, the first and second sides spanning in a longitudinal direction between first and second ends, the airfoil wall circumscribing an internal core cavity;
    a platform attached with the first end of the airfoil wall, the platform including an opening that opens into the internal core cavity and a land region circumscribing the opening; and
    a baffle formed of a tube and an attachment portion, the tube extending in the internal core cavity and the attachment portion having a flange ring that is joined in a first weld joint with the land region and the first weld joint is endless around the flange ring and the land region, wherein the tube includes a flared end connected to the attachment portion at a second weld joint.

2. The airfoil as recited in claim 1, wherein the tube and the attachment portion overlap at the second weld joint.

3. The airfoil as recited in claim 1, wherein the second weld joint is continuous around the tube.

4. The airfoil as recited in claim 1, further comprising a cover connected to an end of the tube opposite the flared end of the tube.

5. The airfoil as recited in claim 1, wherein the flange ring has four perimeter apexes.

6. The airfoil as recited in claim 1, wherein the flange ring is congruent with the land region.

7. The airfoil as recited in claim 6, wherein the first weld joint is airtight.

8. The airfoil as recited in claim 1, wherein the tube and attachment portion are made of metallic alloy.

9. The airfoil as recited in claim 1, wherein the weld joint includes a weld bead that bonds together the flared end and the attachment portion.

* * * * *